T. VON ZWEIGBERGK.
PROTECTION OF HIGH TENSION DIRECT CURRENT MOTORS IN SERIES.
APPLICATION FILED MAR. 28, 1910.
1,006,619.  Patented Oct. 24, 1911.
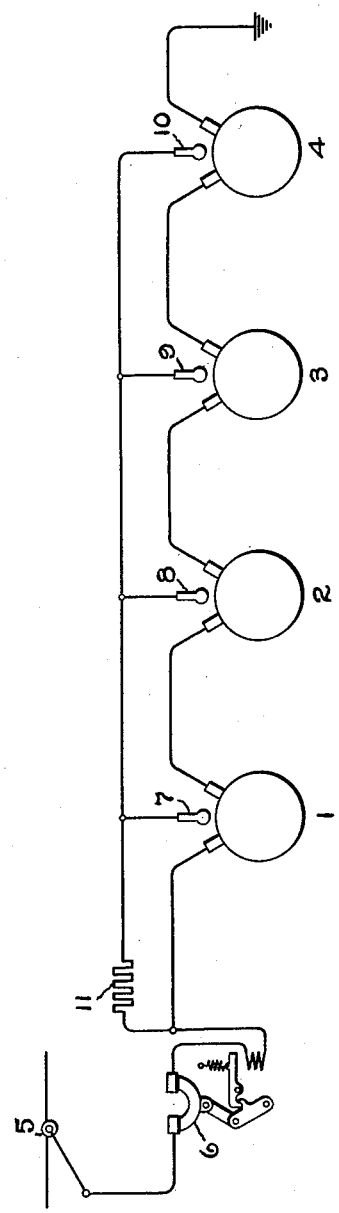
WITNESSES:
J. Earl Ryan.
J. Ellis Glen.
INVENTOR
THORSTEN VON ZWEIGBERGK
BY
HIS ATTORNEY

UNITED STATES PATENT OFFICE.

THORSTEN von ZWEIGBERGK, OF SOUTHPORT, ENGLAND, ASSIGNOR TO GENERAL ELECTRIC COMPANY, A CORPORATION OF NEW YORK.

PROTECTION OF HIGH-TENSION DIRECT-CURRENT MOTORS IN SERIES.

1,006,619.   Specification of Letters Patent.   Patented Oct. 24, 1911.

Application filed March 28, 1910. Serial No. 551,955.

*To all whom it may concern:*

Be it known that I, THORSTEN VON ZWEIGBERGK, a citizen of the United States, residing at Southport, England, have invented certain new and useful Improvements in or Relating to the Protection of High-Tension Direct-Current Motors in Series, of which the following is a specification.

This invention relates to improvements in the automatic protection of high-tension direct-current motors when operated in permanent series. Suppose a number, say 4, high-tension direct-current motors are connected in series with an automatic circuit breaker: If one of the last motors fails, a flash will take place between the brushes or over the commutator of the motor, but the circuit breaker may not act because the motors in front of the damaged motor will give enough counter electromotive force to prevent the current from rising above the limit for which the circuit breaker is set. The result is that the arc established at the damaged motor may continue indefinitely and completely burn out the motor.

The object of this invention is to obviate this danger.

This invention comprises the combination with a number of high-tension direct-current motors connected in permanent series with the current supply through a circuit breaker, of a supplementary circuit from the motor side of the circuit breaker connected in parallel with the series of motors when a flash takes place between the brushes and over the commutator of a motor, for the purpose of insuring the action of the circuit breaker. Preferably the supplementary circuit leads from the motor side of the circuit breaker to a terminal above the commutator of each motor whereby when a flash takes place between the brushes and over the commutator of a motor, this flash will leap to the terminal and automatically connect the supplementary circuit in parallel with the series of motors and thus insure the action of the circuit breaker. In order to prevent a dead short from the circuit breaker through the damaged motor, it is preferred to insert in the supplementary circuit a resistance sufficiently low to insure the action of the circuit breaker.

The accompanying drawing is a diagram showing one method of carrying this invention into effect.

A number (in this case 4) high-tension direct-current motors represented by their commutators 1, 2, 3, 4, are connected in series and receive current supply say from a trolley 5 through an automatic circuit breaker 6.

If the field coils or armature coils of the last motor for example be accidentally earthed, the commutation is at once affected and a flash will occur from brush to brush of the commutator 4. As explained above this might take place without causing the circuit breaker to act and a permanent arc might be set up which would burn the motor 4. To prevent this I place immediately above the commutator of each motor an insulated terminal 7, 8, 9, 10. These are all connected through resistance 11 to the motor side of the circuit breaker. If now a flash takes place over the commutator 4, this flash will at once leap to the terminal 10 which is connected directly to the trolley through the resistance 11 and the circuit breaker 6. The resistance is set low enough to insure that when such a flash takes place the circuit breaker will be operated with certainty.

What I claim as new and desire to secure by Letters Patent of the United States, is,—

1. The combination with a plurality of electric motors connected in series, of a circuit breaker in series with said motors, and means whereby when any one of said motors flashes over said circuit breaker is connected directly with the said motor.

2. The combination with a plurality of electric motors connected in series, of a circuit breaker in series with said motors, an insulated terminal adjacent to the commutator of each motor, and means for connecting said terminal with the motor side of the circuit breaker.

3. The combination with a plurality of electric motors connected in series, of a circuit breaker in series with said motors, a supplementary circuit from the motor side of said circuit breaker, and means whereby any motor which flashes over is connected with said circuit.

4. The combination with a plurality of electric motors connected in series, of a circuit breaker in series with said motors, a supplementary circuit from the motor side of said circuit breaker, and a plurality of terminals connected with said circuit and located adjacent to the commutators of their respective motors.

5. The combination with a plurality of electric motors connected in series, of a circuit breaker in series with said motors, a supplementary circuit from the motor side of said circuit breaker, means whereby the commutator of any motor which flashes over is connected with said circuit, and a resistance in said circuit between the motors and the circuit breaker.

6. The combination with a plurality of electric motors connected in series, of a circuit breaker in series with said motors, a supplementary circuit from the motor side of said circuit breaker, and a plurality of terminals connected with said circuit and located adjacent to the commutators of their respective motors, and a resistance in said circuit between the motors and the circuit breaker.

In witness whereof, I have hereunto set my hand this eighteenth day of March, 1910.

THORSTEN von ZWEIGBERGK.

Witnesses:
H. WATSON,
H. WILLIAMS.

---

Copies of this patent may be obtained for five cents each, by addressing the "Commissioner of Patents, Washington, D. C."